United States Patent
Cooper et al.

(10) Patent No.: US 10,370,040 B1
(45) Date of Patent: Aug. 6, 2019

(54) VEHICLE IMPACT ABSORBING STRUCTURE

(71) Applicant: FORD GLOBAL TECHNOLOGIES, LLC, Dearborn, MI (US)

(72) Inventors: Geoffrey John Cooper, Canton, MI (US); AmirReza Latif, Southgate, MI (US); Sagar Ashok Dhond, Southgate, MI (US); Shunmugam Baskar, West Bloomfield, MI (US); Sreekanth Gondipalle, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/900,318

(22) Filed: Feb. 20, 2018

(51) Int. Cl.
*B62D 25/20* (2006.01)
*B62D 21/15* (2006.01)

(52) U.S. Cl.
CPC ....... *B62D 25/2036* (2013.01); *B62D 21/157* (2013.01)

(58) Field of Classification Search
CPC ... B62D 25/2036; B62D 21/15; B62D 21/157
USPC .......................................... 296/209, 187.12
See application file for complete search history.

(56) References Cited

U.S. PATENT DOCUMENTS

| 7,963,019 | B2 | 6/2011 | Reed et al. |
| 8,366,185 | B2 * | 2/2013 | Herntier ............... B62D 25/025 |
| | | | 296/187.12 |
| 9,493,190 | B1 * | 11/2016 | Alwan ................. B62D 21/157 |
| 10,029,734 | B2 * | 7/2018 | Akhlaque-e-rasul ....... |
| | | | B62D 27/026 |
| 2006/0001294 | A1 | 1/2006 | Balgaard et al. |
| 2012/0086238 | A1 | 4/2012 | Tan |

FOREIGN PATENT DOCUMENTS

DE          10003878 A1    8/2001

* cited by examiner

*Primary Examiner* — Dennis H Pedder
(74) *Attorney, Agent, or Firm* — Vichit Chea; Brooks Kushman P.C.

(57) ABSTRACT

A vehicle body includes a floor side panel, a rocker panel, and a reinforcement structure. The floor side panel is secured to the rocker panel. The floor side panel and the rocker panel each extend longitudinally from a front to a rear of the vehicle body and define a cavity therebetween. The reinforcement structure is disposed within the cavity and forms a plurality of longitudinally aligned crush cans. Each crush can extends laterally from the floor side panel to the rocker panel.

20 Claims, 3 Drawing Sheets

VEHICLE IMPACT ABSORBING STRUCTURE

TECHNICAL FIELD

The present disclosure relates to vehicle safety structures that are configured to protect vehicle passengers and/or batteries in electrified vehicles during impact events.

BACKGROUND

Vehicles may include structures that are designed to absorb energy in order to protect vehicle passengers and/or batteries in electrified vehicles during impact events.

SUMMARY

A vehicle body includes a floor side panel, a rocker panel, and a reinforcement structure. The floor side panel is secured to the rocker panel. The floor side panel and the rocker panel each extend longitudinally from a front to a rear of the vehicle body and define a cavity therebetween. The reinforcement structure is disposed within the cavity and forms a plurality of longitudinally aligned crush cans. Each crush can extends laterally from the floor side panel to the rocker panel.

A vehicle includes a body. The body includes a floor side panel, a rocker panel, and a reinforcement structure. The floor side panel is secured to the rocker panel. The floor side panel and the rocker panel each extend longitudinally from a front to a rear of the vehicle and define a cavity therebetween. The reinforcement structure is disposed within the cavity and forms a plurality of laterally extending crush cans and includes a plurality of webs. Each web extends longitudinally between and links a pair of adjacent crush cans.

A vehicle body includes a side panel, a rocker panel, and a reinforcement structure. The side panel is secured to and is inboard of a rocker panel. The side panel and the rocker panel each extend longitudinally from a front to a rear of the vehicle body and define a cavity therebetween. The reinforcement structure is disposed within the cavity. The reinforcement structure includes upper and lower panels that are secured to each other to form a plurality of longitudinally aligned crush cans. Each crush can extends outboard from the side panel toward the rocker panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
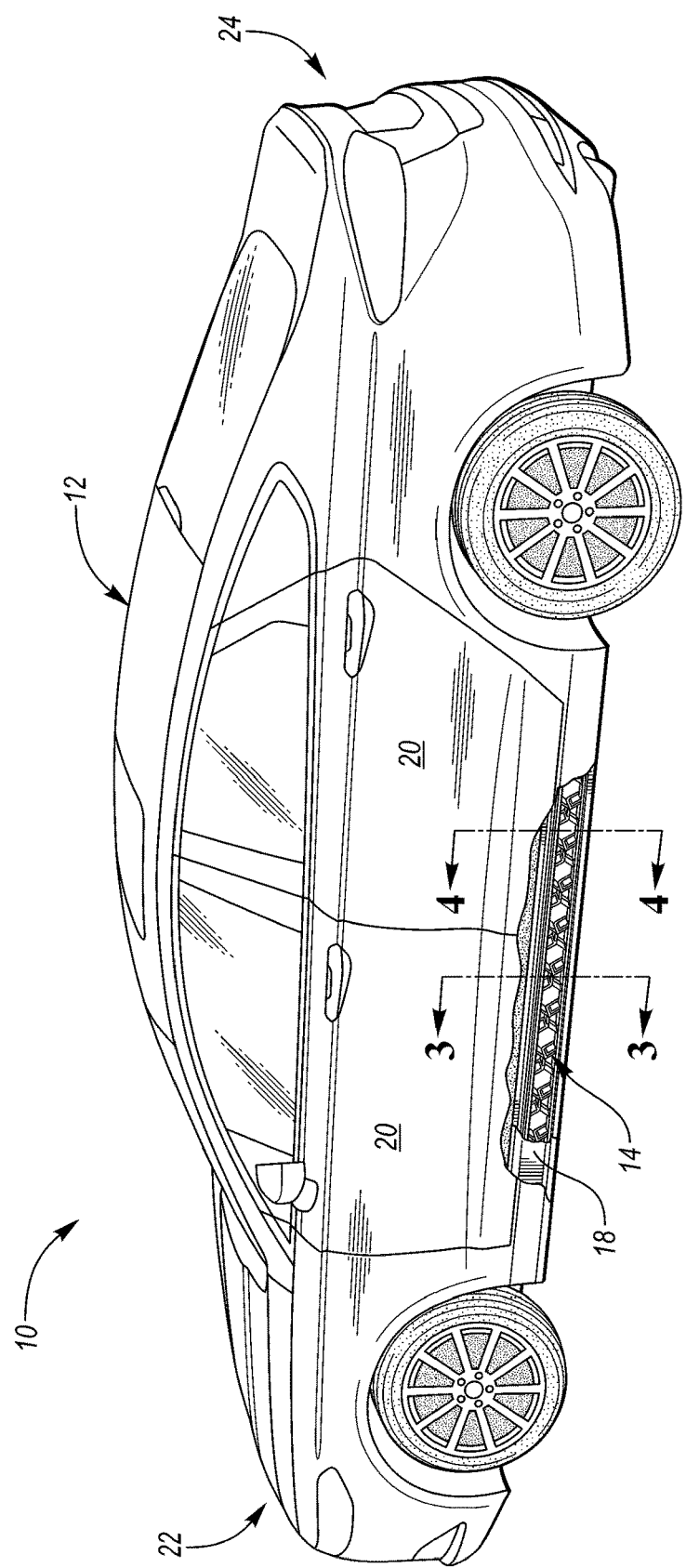
FIG. 1 is a perspective view of a representative vehicle and a representative vehicle body.

Referring to FIG. 1, a perspective view of a vehicle 10 having body 12 is illustrated. The vehicle body 12 may include various components of the vehicle's body-in-white structure. The body-in-white structure may include roof rails, pillars (such as A-pillars, B-pillars, C-pillars, D-pillar, etc.), side rails, front rails, rear rails, strut or shock towers, roof cross members, floor cross members, floor panels, roof panels, firewalls, radiator core supports, powertrain component supports (e.g., engine or transmission supports), sills, rocker panels, or any other component of the vehicle body-in-white structure or the frame known in the art. The body components may be connected to each other by different joining processes including welding, via adhesives, and/or via fasteners such as rivets, screws, bolts, or any other type of fastener known to a person of ordinary skill in the art.

The vehicle body 12 may include a reinforcement structure 14. The reinforcement structure 14 may be disposed within a cavity defined between a floor side panel (or side sill) 16 and a rocker panel 18. The floor side panel 16 and the rocker panel 18 are each located beneath the doors 20 of the vehicle 10. The floor side panel 16 and the rocker panel 18 may be secured to each other by any joining process including welding, via adhesives, and/or via fasteners such as rivets, screws, bolts, or any other type of fastener known to a person of ordinary skill in the art. The rocker panel 18 may be outboard of (or exterior to) the floor side panel 16 relative to the vehicle 10 or vehicle body 12, while the floor side panel 16 may be inboard of (or interior to) the rocker panel 18 relative to the vehicle 10 or vehicle body 12. The floor side panel 16 and the rocker panel 18 may each extend longitudinally from a front 22 of the vehicle 10 (or a front of the vehicle body 12) to a rear 24 of the vehicle 10 (or a rear of the vehicle body 12). The floor side panel 16 and the rocker panel 18 may each extend from a front wheel to a rear wheel of the vehicle.

Figure 2:
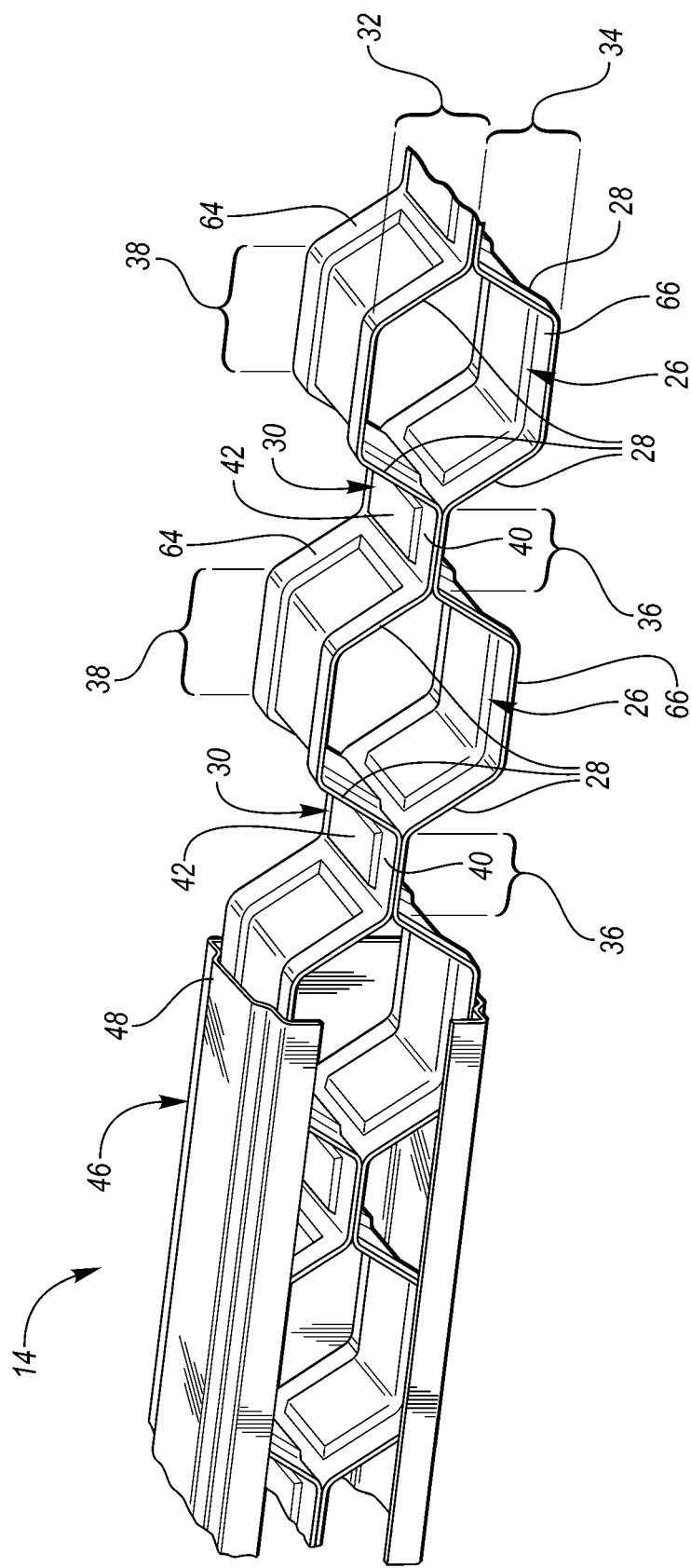
FIG. 2 is a perspective view of a reinforcement structure.

Referring now to FIGS. 1 and 2, the reinforcement structure 14 is described in further detail. The reinforcement structure 14 may form plurality crush cans 26. The crush cans 26 may be longitudinally aligned in a row extending from the front 22 of the vehicle 10 to the rear 24 of the vehicle 10. The crush cans 26 may form cells. More specifically, the crush cans 26 may include exterior walls 28 that define an interior opening. The crush cans 26 are shown to have six exterior walls 28 forming a hexagonal shape. However, it should be understood that the crush cans 26 may have a circular shape or may have three or more exterior walls 28 that form any desirable shape. The exterior walls 28 of the crush cans 26 do not need to be of equal length, gauge (e.g., wall thickness), or shape.

The crush cans 26 may extend laterally outward (or outboard), relative to the vehicle 10 or vehicle body 12, from the floor side panel 16 to the rocker panel 18. More specifically, the exterior walls 28 of the crush cans 26 may extend laterally outward (or outboard), relative to the vehicle 10 or vehicle body 12, from the floor side panel 16 to the rocker panel 18. Extending laterally outward relative the vehicle 10 or vehicle body 12 may refer to an extension in a direction that is substantially perpendicular to a longitudinal direction, where the longitudinal direction extends from the front 22 to the rear 24 of the vehicle 10. Substantially perpendicular may refer to any angle ranging from 80° to 100°.

The reinforcement structure 14 may further include a plurality of webs 30. Each of the plurality of webs 30 extends longitudinally from the front 22 to the rear 24 of the vehicle 10 and between a pair of adjacent crush cans 26 in order to link or secure the pair of adjacent crush cans 26 to each other. Each of the crush cans 26 may be secured to at least one adjacent crush can 26 by one of the plurality of webs 30.

The reinforcement structure 14 may include an upper panel 32 and a lower panel 34. The upper panel 32 and the lower panel 34 may be secured to each other to form a single structure that includes the crush cans 26 and the plurality of webs 30. The upper panel 32 and the lower panel 34 may each have aligned sections 36 and offset sections 38. The upper panel 32 may be secured to the lower panel 34 along the aligned sections 36. Once the upper panel 32 is secured to the lower panel 34 along the aligned sections 36, the offset sections 38 may form the plurality of crush cans 26 while the aligned sections 36 may form the plurality of webs 30 that link or secure the adjacent crush cans 26 to each other.

Figure 3:
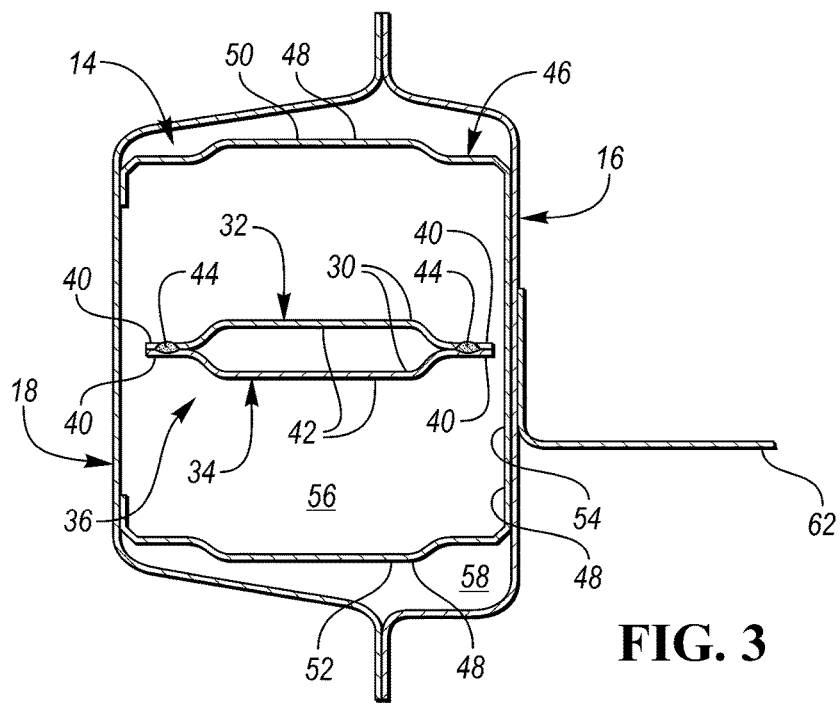
FIG. 3 is a cross-sectional view taken along line 3-3 in FIG. 1.

Referring now to FIGS. 2 and 3, the aligned sections 36 of the upper panel 32 and the lower panel 34 may each include stepped flanges 40 that extend laterally outward from middle portions 42. The upper panel 32 and the lower panel 34 may be secured to each other via welds 44 that that extend through the stepped flanges 40 in the upper panel 32 and into the stepped flanges 40 in the lower panel 34. Although welds 44 are depicted in the FIGS. 3 and 4, it should be understood that the upper panel 32 may be secured to the lower panel 34 by any joining process including welding, via adhesives, and/or via fasteners such as rivets, screws, bolts, or any other type of fastener known to a person of ordinary skill in the art.

Figure 4:
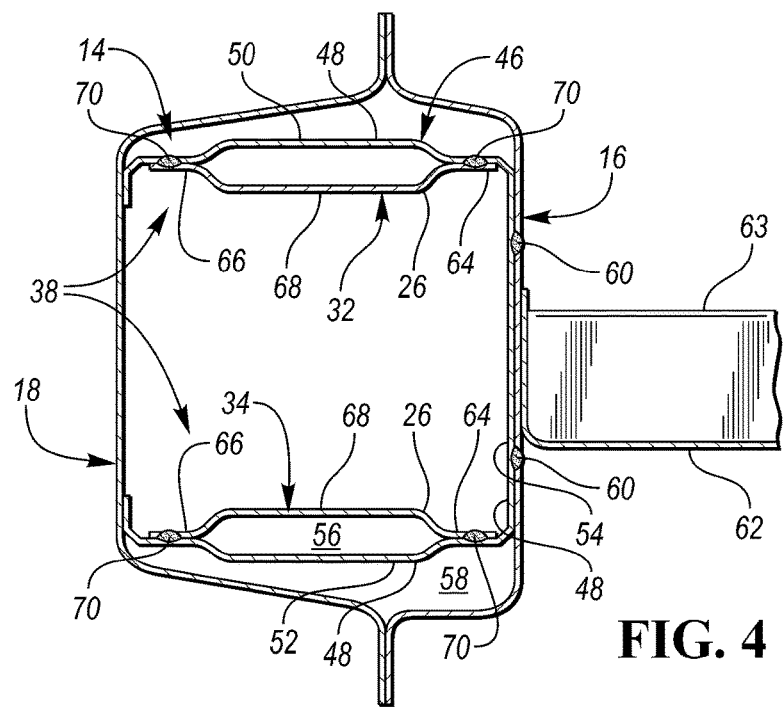
FIG. 4 is a cross-sectional view taken along line 4-4 in FIG. 1.

Referring now to FIGS. 2, 3, and 4, the reinforcement structure 14 further includes an external sleeve, container, sheath, or case 46 that extends longitudinally from the front 22 to the rear 24 of the vehicle 10. More specifically, the external case 46 may include exterior walls 48 that extend longitudinally from the front 22 to the rear 24 of the vehicle 10. The exterior walls 48 may include a top panel 50, a bottom panel 52, and a back panel 54.

The external case 46 (or more specifically the exterior walls 48 of the external case 46) defines an internal channel 56. The plurality of crush cans 26 and the plurality of webs 30 may be disposed within the internal channel 56 of the external case 46. More specifically, the upper panel 32 and the lower panel 34 (which comprise the plurality of crush cans 26 and the plurality of webs 30) may be disposed within the internal channel 56 of the external case 46. A cutaway view of the external case 46 is depicted in FIG. 2 for illustrative purposes. However, it should be understood that the external case 46, the upper panel 32, and the lower panel 34 may each extend the same or substantially the same length longitudinally from the front 22 to the rear 24 of the vehicle 10.

The reinforcement structure 14, including the external case 46, upper panel 32, and lower panel 34, may be disposed within the cavity 58 defined between the floor side panel 16 and the rocker panel 18. The top panel 50 and the bottom panel 52 of the external case 46 may extend from opposing ends of the back panel 54, which is adjacent to the floor side panel 16, and toward the rocker panel 18. The external case 46 may be secured to the floor side panel 16 via welds 60 that extend through the back panel 54 and into the floor side panel 16. The welds may be positioned within the interior openings of the crush cans 26. The floor side panel 16 may also be secured to a floor panel 62 and/or cross-beam 63 that extends laterally relative to the vehicle 10 or vehicle body 12. Although welds 60 are depicted in the FIGS. 3 and 4, it should be understood that the external case 46 may be secured to the floor side panel 16 by any joining process including welding, via adhesives, and/or via fasteners such as rivets, screws, bolts, or any other type of fastener known to a person of ordinary skill in the art.

In alternative embodiment, the back panel 54 of the external case 46 may be adjacent to the rocker panel 18 such that the top panel 50 and the bottom panel 52 of the external case 46 extend from opposing ends of the back panel 54 towards the floor side panel 16. In the alternative embodiment, the reinforcement structure 14 may be secured to the rocker panel 18 during the manufacturing process. The external case 46 may be secured to the rocker panel 18 by any joining process including welding, via adhesives, and/or via fastener such as rivets, screws, bolts, or any other type of fastener known to a person of ordinary skill in the art. The access areas may be locally reinforced by, for example by structural foam, honeycomb structure, inserts, internal ribs, etc., to further enhance structural integrity.

The interior openings of the crush cans 26 may act as "access areas" that allow a joining tool (e.g., a welder, a nut runner, a riveting gun, etc.) to engage the reinforcement structure 14 in order to secure the reinforcement structure 14 to either the floor side panel 16 or the rocker panel 18.

Each of the plurality of crush cans 26 (or the offset sections 38 of the upper panel 32 and lower panel 34) includes a first stepped flange 64 and a second stepped flange 66. The first stepped flanges 64 extend laterally outward relative to the vehicle 10 or vehicle body 12 from the crush cans 26 toward the floor side panel 16. The second stepped flanges 66 extend laterally outward relative to the vehicle 10 or vehicle body 12 from the crush cans 26 toward the rocker panel 18. More specifically, the first stepped flange 64 and the second stepped flange 66 may extend laterally outward from middle portions 68 of the crush cans 26. Stated alternatively, the first stepped flange 64 and the second stepped flange 66 may extend laterally outward from opposing ends of the crush cans 26 toward the floor side panel 16 and rocker panel 18, respectively. The middle portions 68 of the crush cans 26 and the external case 46 may define a cavity therebetween when the upper panel 32 and to the lower panel 34 are secured to the external case 46. The crush cans 26 (or the offset sections 38 of the upper panel 32 and lower panel 34) may be secured to the external case 46 within the cavity 58 defined between the floor side panel 16 and the rocker panel 18 (and within the internal channel 56 defined by the external case 46) via welds 70 that extend through at least one of the first stepped flange 64 and the second stepped 66 flange and into the external case 46. "At least one of the first stepped flange 64 and the second stepped flange 66" may refer to the first stepped flange 64 alone, the second stepped flange 66 alone, or both the first stepped flange 64 and the second stepped flange 66.

The upper panel 32 and the lower panel 34 may be made via stamping, roll-forming, casting, hydroforming, or any other manufacturing process known to a person of ordinary skill in the art. In at least one approach, the upper panel 32, lower panel 34, and the external case 46 may each be made from a rolled sheet metal material such as rolled steel or rolled aluminum. The crush cans 26 formed by the lower panel 32 and upper 34 are oriented to face laterally outward from the vehicle 10 or vehicle body 12 in order to absorb or transfer energy during side impacts or collisions. The exterior walls 38 of the external case 46 are oriented to extend longitudinally from the front 22 to the rear 24 of the vehicle 10 in order to absorb or transfer energy during front and rear impacts or collisions, which may be head-on, oblique, or offset impacts or collisions.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle body comprising:
   a floor side panel secured to a rocker panel, each extending longitudinally between a front and a rear of the vehicle body and defining a cavity therebetween; and
   a reinforcement structure disposed within the cavity and forming a plurality of longitudinally aligned crush cans, each crush can extending laterally from the floor side panel to the rocker panel, the reinforcement structure further comprising a plurality of webs and an external case that defines a channel, wherein each crush can is secured to at least one adjacent crush can via one of the plurality of webs, and wherein the plurality of crush cans and the plurality of webs are disposed within the channel.

2. The vehicle body of claim 1 wherein each of the plurality of crush cans includes first and second stepped flanges each extending laterally outward from opposing ends of the crush cans toward the floor side panel and rocker panel, respectively.

3. The vehicle body of claim 2, wherein the plurality of crush cans is secured to the external case within the cavity via welds that extend through at least one of the first and second stepped flanges and into the external case.

4. The vehicle body of claim 1, wherein the external case includes a top panel, a bottom panel, and a back panel, the top and bottom panels extending from opposing ends of the back panel, which is adjacent to the floor side panel, and toward the rocker panel.

5. The vehicle body of claim 4, wherein the external case is secured to the floor side panel via welds that extend through the back panel and into the floor side panel.

6. The vehicle body of claim 1, wherein the reinforcement structure includes an upper panel and a lower panel each having aligned and offset sections, and wherein the upper panel is secured to the lower panel along the aligned sections such that offset sections form the plurality of crush cans and the aligned sections form the plurality of webs.

7. The vehicle body of claim 6, wherein the aligned sections of the upper panel and the lower panel each include stepped flanges, and wherein the upper panel is secured to the lower panel via welds that extend through the stepped flanges in the upper panel and into the stepped flanges in the lower panel.

8. A vehicle comprising:
   a body having a floor side panel secured to a rocker panel, each panel extending longitudinally between a front and a rear of the vehicle and defining a cavity therebetween; and
   a reinforcement structure disposed within the cavity, forming a plurality of laterally extending crush cans, and including a plurality of webs, each web extending longitudinally between and linking a pair of adjacent crush cans, the reinforcement structure further comprising an external case that defines a channel, wherein the plurality of crush cans and plurality of webs are disposed within the channel.

9. The vehicle of claim 8, wherein each of the plurality of crush cans includes first and second stepped flanges each extending laterally outward from opposing ends of the crush cans toward the floor side panel and rocker panel, respectively.

10. The vehicle of claim 9, wherein the plurality of crush cans is secured to the external case within the cavity via welds that extend through at least one of the first and second stepped flanges and into the external case.

11. The vehicle of claim 8, wherein the external case includes a top panel, a bottom panel, and a back panel, the top and bottom panels extending from opposing ends of the back panel, which is adjacent to the rocker panel, and toward the floor side panel.

12. The vehicle of claim 11, wherein the external case is secured to the rocker panel via welds that extend through the rocker panel and into the back panel.

13. The vehicle of claim 8, wherein the reinforcement structure includes an upper panel and a lower panel each having aligned and offset sections, and wherein the upper panel is secured to the lower panel along the aligned sections such that offset sections form the plurality of crush cans and the aligned sections form the plurality of webs.

14. The vehicle of claim 13, wherein the aligned sections of the upper panel and the lower panel each include stepped flanges, and wherein the upper panel is secured to the lower panel via welds that extend through the stepped flanges in the upper panel and into the stepped flanges in the lower panel.

15. A vehicle body comprising:
   a side panel secured to and inboard of a rocker panel, each extending longitudinally between a front and a rear of the vehicle body and defining a cavity therebetween; and
   a reinforcement structure disposed within the cavity and including upper and lower panels secured to each other to form a plurality of longitudinally aligned crush cans, each crush can extending outboard from the side panel toward the rocker panel, the reinforcement structure further comprising a plurality of webs and an external case that defines a channel, wherein each crush can is secured to at least one adjacent crush can via one of the plurality of webs, and wherein the plurality of crush cans and plurality of webs are disposed within the channel.

16. The vehicle body of claim 15, wherein each of the plurality of longitudinally aligned crush cans includes first and second stepped flanges each extending laterally outward from opposing ends of the crush cans toward the side panel and rocker panel, respectively.

17. The vehicle body of claim 16, wherein the plurality of longitudinally aligned crush cans is secured to the external case within the cavity via welds that extend through at least one of the first and second stepped flanges and into the external case.

18. The vehicle body of claim 15, wherein the external case includes a top panel, a bottom panel, and a back panel, the top and bottom panels extending from opposing ends of the back panel, which is adjacent to the rocker panel, and toward the side panel.

19. The vehicle body of claim 15, wherein the reinforcement structure includes the upper panels and the lower panels each having aligned and offset sections, and wherein the upper panel is secured to the lower panel along the aligned sections such that offset sections form the plurality of crush cans and the aligned sections form the plurality of webs.

20. The vehicle body of claim 19, wherein the aligned sections of the upper panel and the lower panel each include stepped flanges, and wherein the upper panel is secured to the lower panel via welds that extend through the stepped flanges in the upper panel and into the stepped flanges in the lower panel.

\* \* \* \* \*